(12) United States Patent
Reber et al.

(10) Patent No.: US 10,319,364 B2
(45) Date of Patent: Jun. 11, 2019

(54) ARTIFICIAL INTELLIGENCE-BASED TEXT-TO-SPEECH SYSTEM AND METHOD

(71) Applicant: Telepathy Labs, Inc., Tampa, FL (US)

(72) Inventors: Martin Reber, Remetschwil (CH); Vijeta Avijeet, Dübendorf (CH)

(73) Assignee: Telepathy Labs, Inc., Tampa, FL (US)

( * ) Notice: Subject to any disclaimer, the term of this patent is extended or adjusted under 35 U.S.C. 154(b) by 0 days.

(21) Appl. No.: 15/982,326

(22) Filed: May 17, 2018

(65) Prior Publication Data

US 2018/0336881 A1    Nov. 22, 2018

Related U.S. Application Data

(60) Provisional application No. 62/508,024, filed on May 18, 2017.

(51) Int. Cl.
*G10L 13/08* (2013.01)
*G06K 9/62* (2006.01)
(Continued)

(52) U.S. Cl.
CPC ............ *G10L 13/08* (2013.01); *G06K 9/6247* (2013.01); *G06K 9/6298* (2013.01); *G06N 3/02* (2013.01);
(Continued)

(58) Field of Classification Search
CPC ..................................................... G10L 25/30
(Continued)

(56) References Cited

U.S. PATENT DOCUMENTS

| 6,163,769 A | * | 12/2000 | Acero | ..................... G10L 13/07 704/243 |
| 6,556,682 B1 | * | 4/2003 | Gilloire | ................. H04M 9/082 379/406.01 |

(Continued)

FOREIGN PATENT DOCUMENTS

EP    1308928 A2    5/2003

OTHER PUBLICATIONS

Zwicker, Eberhard, and Hugo Fastl. Psychoacoustics: Facts and models. vol. 22. Springer Science & Business Media, 2013. (471 Pages).

(Continued)

*Primary Examiner* — Jakieda R Jackson
(74) *Attorney, Agent, or Firm* — Michael T. Abramson; Holland & Knight LLP

(57) ABSTRACT

A technique improves training and speech quality of a text-to-speech (TTS) system having an artificial intelligence, such as a neural network. The TTS system is organized as a front-end subsystem and a back-end subsystem. The front-end subsystem is configured to provide analysis and conversion of text into input vectors, each having at least a base frequency, $f_0$, a phenome duration, and a phoneme sequence that is processed by a signal generation unit of the back-end subsystem. The signal generation unit includes the neural network interacting with a pre-existing knowledgebase of phenomes to generate audible speech from the input vectors. The technique applies an error signal from the neural network to correct imperfections of the pre-existing knowledgebase of phenomes to generate audible speech signals. Speech signal specific modelling techniques in combination with applied psychoacoustic principles drive training efficiency of neural networks with positive impact on quality of generated speech signals.

20 Claims, 11 Drawing Sheets

(51) Int. Cl.
 G06N 5/02 (2006.01)
 G06N 3/02 (2006.01)
 G10L 19/00 (2013.01)
 G10L 13/04 (2013.01)

(52) U.S. Cl.
 CPC ............... *G06N 5/02* (2013.01); *G10L 13/04* (2013.01); *G10L 19/00* (2013.01)

(58) Field of Classification Search
 USPC .................................... 704/200.1, 232, 259
 See application file for complete search history.

(56) References Cited

U.S. PATENT DOCUMENTS

| | | | | |
|---|---|---|---|---|
| 7,765,103 | B2* | 7/2010 | Yamazaki | G10L 13/07 704/255 |
| 2004/0122662 | A1* | 6/2004 | Crockett | G10L 21/04 704/200.1 |
| 2006/0181245 | A1* | 8/2006 | Mizuno | G01R 31/3624 320/132 |
| 2006/0224391 | A1 | 10/2006 | Tamura et al. | |
| 2007/0233489 | A1 | 10/2007 | Hirose et al. | |
| 2009/0018825 | A1* | 1/2009 | Bruhn | G10L 25/69 704/222 |
| 2009/0048844 | A1 | 2/2009 | Morinaka et al. | |
| 2012/0143611 | A1 | 6/2012 | Qian et al. | |
| 2013/0080173 | A1 | 3/2013 | Talwar et al. | |
| 2013/0218568 | A1 | 8/2013 | Tamura et al. | |
| 2014/0122081 | A1 | 5/2014 | Kasczuk et al. | |
| 2014/0278416 | A1 | 9/2014 | Schuster et al. | |
| 2015/0170637 | A1 | 6/2015 | Kim et al. | |
| 2018/0034433 | A1* | 2/2018 | Nigam | H03G 3/3005 |
| 2018/0182396 | A1 | 6/2018 | An | |
| 2018/0213336 | A1 | 7/2018 | Rosenkranz et al. | |

OTHER PUBLICATIONS

Wikepedia Article "Auditory Masking" https://en.wikipedia.org/wiki/Auditory_masking , (8 Pages).
Wikepedia Article "Psychoacoustics" https://en.wikipedia.org/wiki/Psychoacoustics, (6 Pages).
Arik et al., "Deep Voice: Real-Time Neural Text-to-Speech", International Conference on Machine Learning (ICML) Mar. 7, 2017.
Elze, Tobias—Thesis—"Modeling of a Recurrent Neural Network for Principal Component Analysis" Oct. 2, 2003.
Knill, Kate, "(Deep) Neural Networks for Speech Processing", Sep. 2015, Cambridge University Engineering Department, Dreams Summer School Tutorial, 2015.
Parthasarathy, Dhruv, "Baidu Deep Voice explained: Part 1—The Inference Pipeling" Printed Apr. 12, 2018, https://blog.athelas.com/paper-1-baidus-deep-voice-675a323705df.
Ping et al., "Deep Voice 3: Scaling Text-to-Speech with Convolutional Sequence Learning" ICLR 2018 Conference.
International Search Report issued in PCT Application No. PCT/US2018/033167 dated Nov. 15, 2018.
Non-Final Office Action issued in U.S. Appl. No. 16/022,823 dated Sep. 21, 2018.
Arik, et al. "Deep Voice: Real-Time Neural Text-to-Speech," International Conference on Machine Learning (ICML) Mar. 7, 2017 (17 Pages).
Elze, Tobias—Thesis—"Modeling of a Recurrent Neural Network for Principal Component Analysis" Oct. 2, 2003 (81 Pages).
Fing et al., "Deep Voice 3: Scaling Text-To-Speech with Convolutional Sequence Learning" ICLR 2018 Conference (16 Pages).
Knill, Kate, "(Deep) Neural Networks for Speech Processing" Sep. 2015, Cambridge University Engineering Department, Dreams Summer School Tutorial, 2015 (68 Pages).
Parthasarathy, Dhruv," Baidu Deep Voice explained: Part 1—The Inference Pipeline" Printed Apr. 12, 2018 https://blog.athelas.com/paper-1-baidus-deep-voice-675a323705df (12 Pages).
Notice of Allowance issued in U.S. Appl. No. 16/022,823 dated Mar. 20, 2019.

* cited by examiner

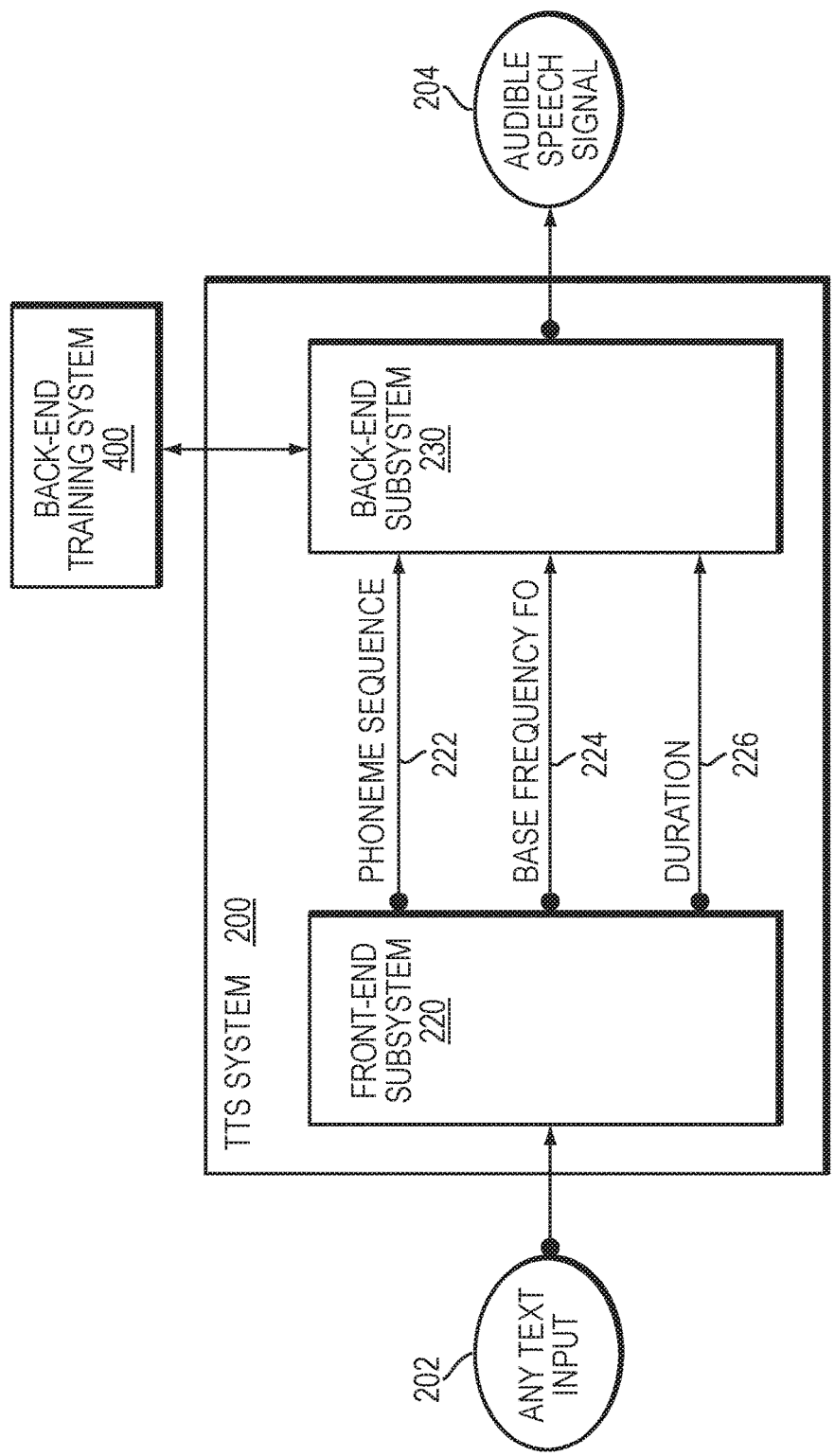

ARTIFICIAL INTELLIGENCE-BASED TEXT-TO-SPEECH SYSTEM AND METHOD

CROSS-REFERENCE TO RELATED APPLICATIONS

The present application claims the benefit of U.S. Provisional Patent Application Ser. No. 62/508,024, which was filed on May 18, 2017, by Martin Reber and Vijeta Avijeet for a PSYCHOACOUSTIC-BASED TEXT-TO-SPEECH SYSTEM AND METHOD, which is hereby incorporated by reference.

TECHNICAL FIELD

The present disclosure relates generally to text-to-speech systems that synthesize speech and to training of text-to-speech systems, more specifically to artificial intelligence-based text-to-speech systems and the training of such systems.

BACKGROUND

Text-to-speech systems typically synthesize speech from text input that generate sounds which may be perceived by a listener as inaccurate or imperfect (i.e., flawed). Such imperfection results, because hearing is not a purely mechanical phenomenon of wave propagation, but also a sensory and perceptual event to the listener. In other words, when the listener hears a sound, that sound arrives at the ear as a mechanical wave traveling through the air which is transformed by the ear into neural action potentials that travel to the brain where they are perceived. Hence, for acoustic technology such as audio processing, it is advantageous to consider not just the mechanics of the environment, but also the fact that both the ear and the brain are involved in a listener's experience.

The inner ear, for example, does significant signal processing in converting sound waveforms into neural stimuli, though not all differences between sound waveforms are perceived. Specifically, there are sensitivity limits when dealing with individual sound waveforms such as volume and frequency. Most of these effects are non-linear in that perceived loudness depends on intensity level as well as on frequency, i.e., loudness depends on sound intensity level non-linearly. The human ability to identify absolute frequency levels is also limited. Furthermore, it is especially hard for humans to differentiate audio signals having different phase information. Perception of human hearing is also affected when two signals need to be processed nearly at the same time.

SUMMARY

Embodiments described herein are directed to a technique for improving training and speech quality of a text-to-speech (TTS) system having an artificial intelligence, such as a neural network. The described embodiments provide a solution to a need in the field to correct perceived inaccuracies and imperfections in synthesized speech. The TTS system is organized as a front-end subsystem and a back-end subsystem. The front-end subsystem is configured to provide analysis and conversion of text (e.g., symbols representing alphanumeric characters) into input vectors, each having at least a pitch contour for a phoneme (e.g., a base frequency, $f_0$), a phenome duration (D), and a phoneme sequence (e.g., a context, ph) that is processed by a signal generation unit of the back-end subsystem. The signal generation unit includes the neural network interacting with a pre-existing knowledgebase of phenomes (e.g., acoustic samples, synthesized phonemes) to generate audible speech from the input vectors. Illustratively, the technique applies an error signal from the neural network to correct imperfections of the pre-existing knowledgebase of phenomes to generate audible speech signals surpassing the quality level of the pre-existing knowledgebase. A back-end training system of the TTS is configured to train the signal generation unit by applying psychoacoustic principles to measure the quality of the generated audible speech signals. To that end, components of the back-end training system cooperate to provide an adaptive interference system that extracts data from the signal generation unit during a training mode used to determine a quality indicator.

Unlike prior systems that employ large and complex neural networks to implement direct input vector-to-generated speech from hundreds of hours of speech samples, the technique described herein substantially reduces neural network complexity and processing requirements by focusing efforts on capturing errors and inaccuracies in the generated speech from the pre-existing knowledgebase in the neural network. That is, instead of attempting to capture in a neural network how to generate speech directly from sound samples as in the prior art, the technique captures an error signal that is applied to previously generated speech from the pre-existing knowledgebase so as to correct imperfections (e.g., reduce perceived flaws) in the generated speech. As such, a significantly smaller neural network may be deployed in the TTS along with commensurate reductions in memory and processor resources. In addition, the technique guarantees that the generated speech is no worse than the pre-existing knowledgebase and, thus, produces comprehensible audible speech according to the input vector.

The pre-existing knowledgebase may include average basic acoustic signal data of how a speaker speaks (e.g., average or mean of how the speaker says "O" and how the speaker says "M") derived from averaging of hours (e.g., 10 hours) of recorded audible speech. The input vector may have a frequency (e.g., 2 to 10 vectors per second) typical of human speech and may be up-sampled (increased) to match a higher frequency (e.g., an acoustic frequency of at least 16 kHz) of the generated audible speech. More specifically, an up-sampling unit of the signal generation unit may generate an in-vector (also referred to as an intermediate vector) phoneme sequence at the acoustic frame rate from the input vector phoneme sequence (ph), duration (D), and base frequency ($f_0$) per sequence of samples i, i.e., in(ph, $f_0$, D, i) that is applied to the neural network and the pre-existing knowledgebase.

Embodiments include the back-end training system used to iteratively modify (i.e., train) the neural network based on psychoacoustic processing (e.g., masking) and allowing for ignoring of the processing of inaudible sound/speech imperfections to determine the quality indicator used as a feedback to change weights and/or a topology of the neural network. Specifically, the training system may use frequency and time domain reference signals from original reference recordings as reference audio signals that are compared to (e.g., subtracted from) the generated audible speech (in frequency and time domains) to determine with help of the psychoacoustic processing (e.g., generated parameters/weights) an audible sound error signal. The calculated audible sound error signal may include frequency and time domain components to calculate the quality indicator used to train the neural network.

To curtail neural network complexity (e.g., size and depth of the neural network) as well as decrease training time, some embodiments reduce the processing complexity by using lossy time domain-to-frequency domain transformations for voiced phonemes based on principal component analysis that removes components below an audible threshold, as well as lossy time domain-to-frequency domain transformations for unvoiced phonemes based on noise band modeling and noise energy thresholds.

As a further refinement, some embodiments normalize a processing period for different phoneme pitches by including pitch normalization during the input vector up-sampling and applying inverse pitch normalization to the generated audible speech. In this manner, processing is simplified as only periods of a same length are processed. Specifically, pitch normalization during up-sampling converts the signal to a single (i.e., normalized) frequency having a same pitch length. The trained neural networks will in this case also be trained for compensating imperfections introduced via pitch normalization.

Advantageously, the technique described herein improves training speed and speech output quality. Specifically, (i) the neural network need not be trained to synthesize speech, but need only be trained to correct inaccuracies (e.g., reduced perceived flaws) in the pre-existing knowledgebase; (ii) the training of the neural network may be simplified by training for inaccuracies and imperfections according to a psychoacoustic model and discarding inaudible corrections; and (iii) the complexity and training of the neural network may be further reduced by using lossy and for speech signals optimized representation approaches, e.g., principal component analysis for voiced phonemes and noise band/energy band thresholding for unvoiced phonemes.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 4A is a block diagram of the TTS system in training mode;

DETAILED DESCRIPTION

Text-to-Speech System

Figure 1:
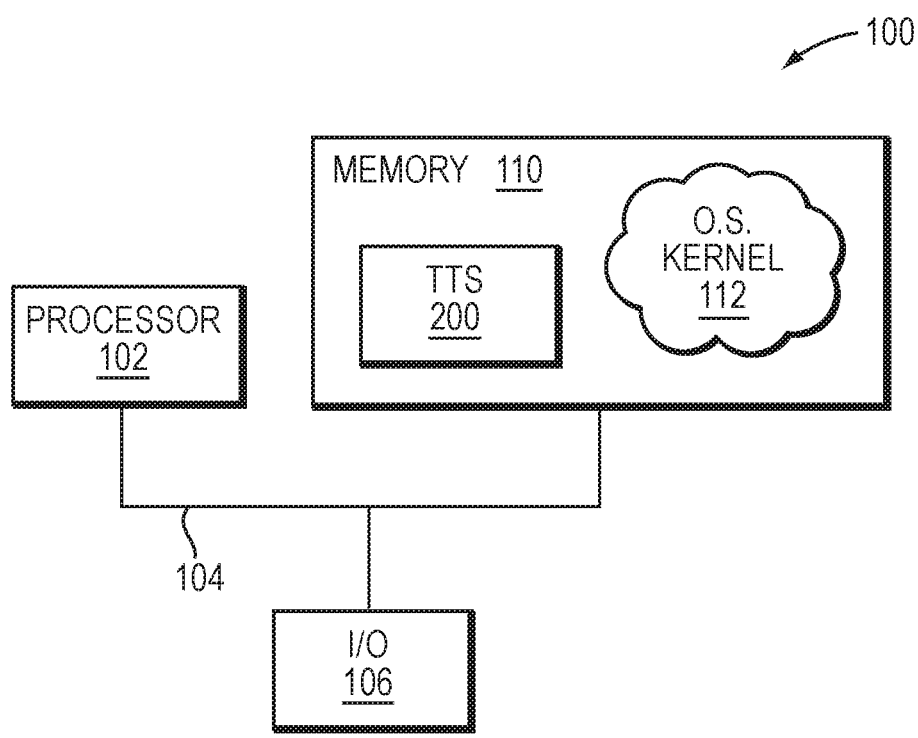
FIG. 1 is a block diagram of a text-to-speech computing platform.

FIG. 1 is a block diagram of a computer system illustratively embodied as a text-to-speech system (TTS) computing platform 100 that includes one or more processors 102, a memory 110, and one or more input/output (I/O) devices 106 interconnected by a bus 104. The I/O devices 106 may include (not shown) a keyboard, a mouse, one or more network interfaces, one or more storage devices, and audio output (e.g., a speaker). The memory 110 includes a plurality of memory locations addressable by the processor 102 for storing software code (e.g., processes and/or services) and data structures associated with the embodiments described herein. The processor may, in turn, include processing elements and/or circuitry configured to execute the software code, such as software processes or modules configured as a TTS system 200.

It will be apparent to those skilled in the art that other types of processing elements and memory, including various computer-readable media, may be used to store and execute program instructions pertaining to the embodiments described herein. Also, while the embodiments herein are described in terms of software code, processes, and computer, e.g., applications, programs stored in memory, alternative embodiments also include the code, processes and programs being embodied as logic and/or modules consisting of hardware, software, firmware, or combinations thereof.

As understood by persons of skill in the art, the TTS computing platform 100 may be embodied as a variety of systems and devices, ranging from enterprise class compute servers to mobile phones and other handheld or embedded devices, such as Amazon.com Inc's Echo, Apple Inc's Homepod, Alphabet Inc./Google LLC's Home. In some embodiments, a signal may be generated by the TTS 200 as data sent via the I/O devices 106 (e.g., a network) and reproduced as audible sound on a device (not shown) at a considerable distance. Notably, in other embodiments, the TTS system 200 may be apportioned to different computing devices and memories such that a front-end subsystem is implemented in a first computing device and a back-end subsystem may be implemented in a second computing device connected to the first computing device, e.g., via the network.

Figure 2:
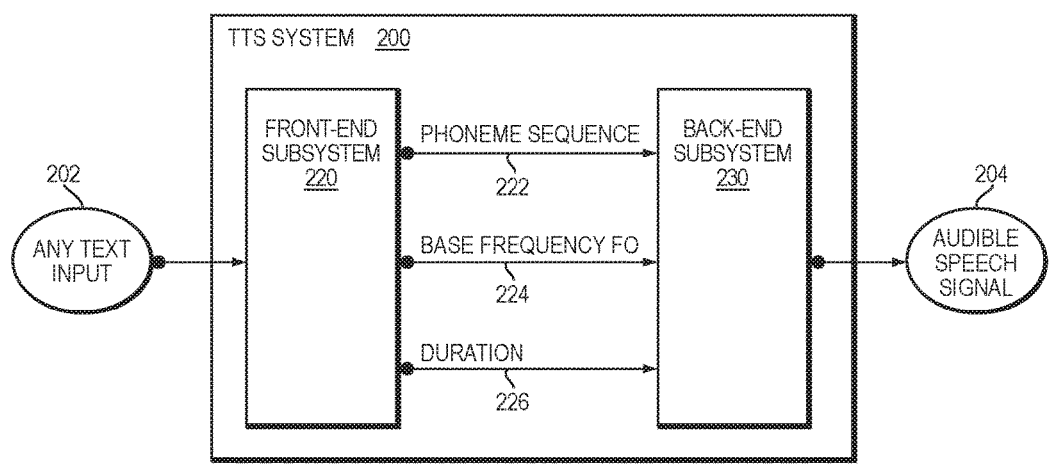
FIG. 2 illustrates general arrangement of a TTS system.

Embodiments described herein are directed to a technique for improving training and speech quality of the TTS system 200 having an artificial intelligence, such as a neural network. FIG. 2 is a block diagram of the TTS system 200 organized as a front-end sub-system 220 and a back-end sub-system 230. The front-end subsystem 220 is configured to provide analysis and conversion of text input 202 (i.e., symbols representing alphanumeric characters) into input vectors, each having at least a pitch contour for a phoneme, e.g., a base frequency (referred to as "$f_0$") 224, a phenome duration (D) 226, and a phoneme sequence 222 (e.g., a context, ph) that is processed by the back-end subsystem 230. In an embodiment, the front-end subsystem 220 manipulates symbolic information, e.g., converts abbreviations to texts (i.e., alphanumeric symbols), and converts the texts to phonemes, as well as analyzes grammatical structure of the texts to determine pronunciation information such as location of emphasis, pauses, and the like.

Illustratively, the front-end subsystem 220 uses the pronunciation information to generate parameters for the phoneme according to a sound of the speech that should be produced: a length of the phoneme (e.g., duration 226), a pitch contour for the phoneme (base frequency, $f_0$, 224), and a phoneme sequence (a context 222). This information is typically relatively static and changes with the occurrence of new phonemes embodied as a low frequency phoneme stream (e.g., 2-10 samples per second) which typically does not match an intended sample rate of the audible speech signal (e.g., 16 kHz). That is, a frequency of the phoneme stream may be as much as three orders of magnitude (i.e., 1000 times) slower than a frequency (i.e., sampling rate) of the audible speech signal. A phoneme sequence may relate to a character of a word which may be one or more letters of the word. For example, the phoneme sequence 222 may relate to letter "A" or letter "M" that may have a base frequency contour. In some examples, the base frequency may be fixed for the duration of a phoneme. As a result, the phoneme stream may be of relatively low frequency (e.g., 2 or 10 new triples of (i) phoneme, (ii) duration and (iii) base frequency in a second) depending on language and speaking style. In contrast, the sample rate of a desired (i.e., perceived adequate fidelity) audible speech signal may be 16 kHz (i.e., 16,000 samples per second).

The back-end subsystem 230 provides signal generation to render (i.e., generate) an audible speech signal 204, illustratively at acoustic sampling rates at least at 16 kHz (e.g., 16 kHz, 32 kHz, 44 kHz, 48 kHz, 96 kHz, and the like used in audio signal reproduction corresponding to varying degrees of acoustic fidelity). As such, the front-end subsystem 220 converts the input text 202 to outputs of the phoneme sequence 222, the base frequency ($f_0$) 224, and the duration 226 of the phoneme. The back-end subsystem 230 then converts the received phoneme sequence, base frequency, and duration of the phoneme into inputs which are used in generating the audible speech signal 204.

Back-End Subsystem of TTS System

Figure 3A:
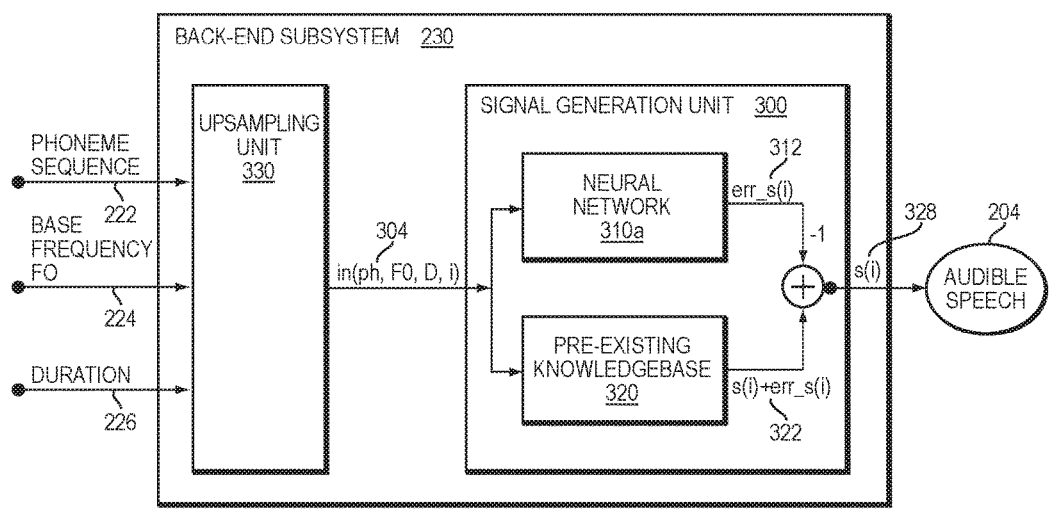
FIG. 3A is a block diagram of an embodiment of a back-end subsystem of the TTS system with time domain speech generation.
Figure 3B:
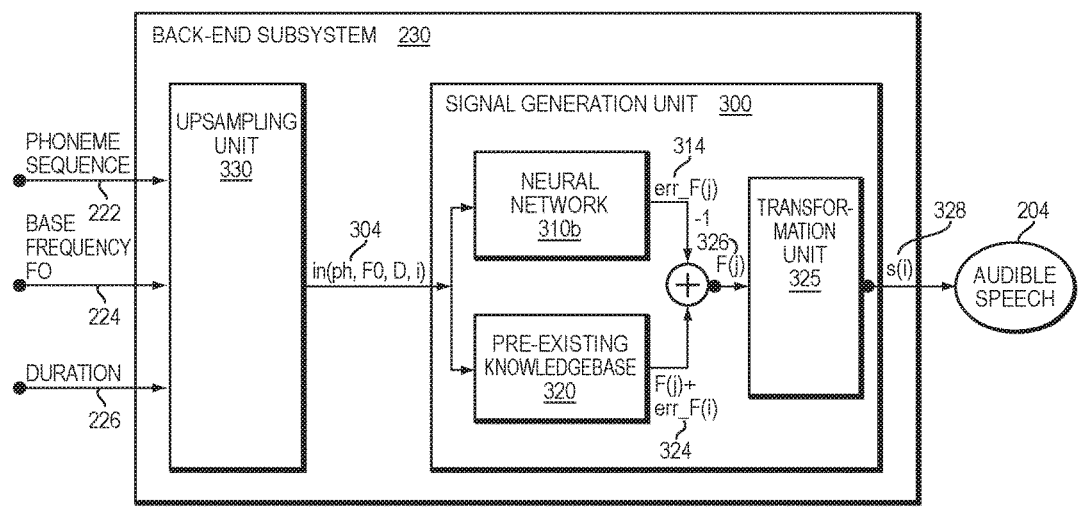
FIG. 3B is a block diagram of another embodiment of the back-end subsystem of the TTS system with frequency domain speech generation.

FIGS. 3A and 3B are block diagrams of embodiments of the back-end subsystem 230 of the TTS system 200 using time domain and frequency domain speech generation in connection with a relatively small neural network that takes advantage of pre-existing knowledge for speech synthesis. This is in comparison to a "brute force" approach for the back-end subsystem in which a deep neural network is trained to directly synthesize the audible speech from the phoneme stream input. The brute force approach suffers from requiring very wide input (i.e., many input nodes for training) for the neural network to produce even fractions of a second of audible speech at an adequate sampling rate, e.g., ¼ second at 16 kHz sampling rate=4000 samples, thus a 4000 input node wide neural network is required. Moreover, the brute force approach requires training the neural network from scratch to capture the generated speech. That is, instead of attempting to capture in a deep (and wide) neural network how to generate speech directly from sound samples as in the prior art, the technique described herein captures an error signal in a relatively small neural network of the back-end subsystem 230 that is applied to speech generated from the pre-existing knowledge. As such, a substantially smaller neural network may be deployed in the back-end subsystem of the TTS system 200 along with commensurate reductions in memory and processor resources.

Illustratively, the back-end subsystem 230 includes a signal generation unit 300 that uses a neural network 310 interacting with a pre-existing knowledgebase 320 of phenomes (e.g., acoustic samples, synthesized phonemes) to resolve imperfections (e.g., correct perceived flaws) in the knowledgebase 320. To that end, the technique described herein applies an error signal from the neural network 310 to correct the imperfections of the phenomes in the pre-existing knowledgebase 320 so as to generate audible speech signals surpassing the quality level of the pre-existing knowledgebase. FIG. 3A illustrates a block diagram of an embodiment of the back-end subsystem 230 with time-domain speech generation, i.e., wherein the signal generation unit 300 functions in time domain.

The back-end subsystem 230 includes an upsampling unit 330 that converts the low frequency input phoneme stream (i.e., an input vector of (i) phoneme sequence 222, (ii) base frequency 224, and (iii) duration 226) into in-vectors 304 (also referred to as intermediate vectors) with the acoustic sampling frequency of the desired audible speech signal 204. The upsampling unit 330 is configured to match the phoneme stream sampling rate to be generally equal to the sampling rate or frequency of the audible speech signal 204 output from the back-end subsystem 230. This may be implemented by repeating the input vector at the output sample rate until a new input vector is provided at the input of the upsampling unit 330, e.g., from one sample to a next sample, the phoneme sequence may relate to a same letter, such as letter "A". The upsampling unit generates an in-vector phoneme sequence 304 (represented as in(ph, $f_0$, D, i)) at the acoustic sampling rate from the phoneme sequence 222, the duration 226 (time that phoneme changes to a new phoneme), and the base frequency 224 ($f_0$) per sequence of samples "i," where the duration (D) for the phoneme relates to a length of time for the phoneme (e.g., a duration of the phoneme for letter "A" or for letter "M"). An s(i) 328 output (i.e., the audible speech signal) of the signal generation unit 300 has a same "i" as the input of the unit 300 (i.e., a same sample rate input as sample rate output), wherein "i" corresponds to a sequence based on each event, such as a phoneme. That is, the "i" is reset for each event and lasts for a duration of the event as determined by the upsampling unit 330.

The signal generation unit 300 uses a time domain neural network 310a to convert the in-vector 304 (i.e., the intermediate vector) from the upsampling unit 330 to the audible speech signal 204, also referred to as a time domain sequence "s(i)" 328 (signal processing function) where "i" refers to a specific sample in the sequence of samples. For example, a single sample in s(i) may relate to 24,000 samples of the in-vector (equaling 1.5 s context when the acoustic sampling rate is 16 kHz). The signal generation unit may analyze all these samples collectively (numbering from one to a maximum number "n") to generate the related s(i) of the audible speech signal 204 for each "i".

Due to the speech signal sampling rate and phoneme context (e.g., 1.5 s), another disadvantage of the brute force approach is that, in some examples, a relatively large number of in-vectors may be processed to produce a single sample of the speech audio signal s(i). In these examples, a deep neural network (DNN) is required to train a large in-vector. The DNN needs to be relatively large and complex as well as wide, because a DNN input requires the upsampled wide in-vector, e.g., for 1.5 s and an acoustic sampling rate of 16 kHz, the DNN processes 24,000 input lines (1.5×16,000) on a time domain basis when using a time domain-based DNN. As such, a signal generation unit needs to be large enough to accommodate thousands of samples and is typically extremely complex and may have thousands of entry points, stages, and nodes.

FIG. 3B illustrates a block diagram of another embodiment of the back-end subsystem with frequency-domain speech generation, i.e., wherein the signal generation unit 300 functions in frequency domain. In this embodiment, the signal generation unit 300 also includes a transformation unit 325. The signal generation unit uses a frequency domain neural network 310b to convert the in-vector 304 (i.e., the intermediate vector) to a frequency domain sequence F(j) 326. The signal generation unit may then use the transformation unit 325 to convert the frequency domain sequence F(j) 326 to the audible speech signal 204 (i.e., s(i) 328). Illustratively, the transformation unit 325 may use a Fourier transformation, e.g., inverse discrete cosine transform (iDCT), to convert the frequency domain sequence F(j) 326 to the audible speech signal 204 in the time domain. Notably, for the time domain embodiment of FIG. 3A, all samples of a sine wave (e.g., 100 Hz) need to be processed which results in significant processing requirements, as previously described. In contrast, for the frequency domain embodiment of FIG. 3B, the signal generation unit need only process the Fourier component(s) of the sine wave without processing every sample of the sine wave in the time domain. Thus, the quantity of information processed is dramatically reduced with commensurate reductions in memory and processor resources.

Back-End Sub-System Error Correction

Referring again to FIG. 3A, the pre-existing knowledgebase 320 provides a basic signal 322 in the time domain based on the in-vector 304 (i.e., the intermediate vector). The basic signal 322 illustratively encompasses the audible speech signal s(i) 328 and a related error signal err_s(i) based on the in-vector. In some embodiments, the pre-existing knowledgebase 320 may be (i) stored in the signal generation unit (e.g., stored in a database of the signal generation unit), (ii) stored in a database, (iii) based on a lookup somewhere else in the TTS system, or (iv) obtained from a database or usage of another TTS system. In yet other embodiments, the pre-existing knowledgebase 320 may be another (i.e., separate) back-end subsystem from another TTS system or the knowledgebase may be obtained from another system having a similar type of information.

Illustratively, the pre-existing knowledgebase 320 may include average basic acoustic signal data of how a speaker speaks (e.g., average or mean of how the speaker says "O" and how the speaker says "M"). The pre-existing knowledgebase 320 may also determine or store the average of how the speaker says each letter (e.g., average of how "O" is spoken, how "M" is spoken, how "I" is spoken, how "E" is spoken, etc.). The average pre-existing knowledge may be derived from averaging of hours (e.g., 10 hours of recording) of recorded audible speech such that the pre-existing knowledge is intrinsic or pre-determined from those recording(s). As a result, the signal generation unit 300 only needs to train the neural network 310a,b for errors that are occurring or for missing information not covered by knowledge of the pre-existing knowledgebase 320 such that the neural network generates error signals. The mean information or average information may be referred to as a "monophone" basic signal information for each letter or sound.

In another embodiment, the pre-existing knowledgebase 320 may include information on how to say each letter in a monotonous form (e.g., a monotonous "O" or a monotonous "M", monophone synthesis). This monotonous form of the letter may be perceived as somewhat robotic, but is relatively close to a preferred audible speech for the letter. The signal generation unit 300 may train the neural network 310a, b to optimize the basic generation of the pre-existing information.

The error signal, err_s(i) 312 (time-domain) or err_F(j) 314 (frequency domain) generated by the neural network 310a,b may relate to deviations, imperfections or differences from the pre-existing knowledgebase 320 (e.g., average letter sound) where the neural network 310a,b has already been trained. The neural network 310a,b may be trained to produce information missing in the pre-existing knowledgebase 320 to correct the output 322, 324 of the pre-existing knowledgebase for improved audible speech. As a result, the error signal 312, 314 may be larger or smaller when compared to the pre-existing knowledgebase 320.

Illustratively, the signal generation unit 300 combines (i.e., adds) the error signal err_s(i) 312 (in the time domain depicted in FIG. 3A) of the neural network 310a which is negative with the basic signal s(i)+err_s(i) 322 of the pre-existing knowledgebase 320. Mathematically, the error signal err_s(i) 312 of the neural network 310a is subtracted from the basic signal s(i)+err_s(i) 324 resulting in audible speech s(i) 328.

In the frequency domain of FIG. 3B, the pre-existing knowledgebase 320 provides the basic signal 324 including the frequency domain sequence F(j) and a related frequency domain error signal err_F(j) based on the in-vector 304 (i.e., the intermediate vector). The neural network 310b generates the error signal err_F(j) 314 in the frequency domain based on the in-vector. Similar to the time domain embodiment of FIG. 3A, the frequency domain embodiment of FIG. 3B includes the basic signal F(j)+err_F(j) 324 and the error signal err_F(j) 314 which are combined (i.e., added) together where the error signal of the neural network 310b is negative. Mathematically, the error signal err_F(j) 314 is subtracted from the basic signal F(j)+err_F(j) 324 resulting in audible speech as a frequency domain sequence F(j) 326. In addition, the signal generation unit 300 of the frequency domain embodiment of FIG. 3B includes transformation unit 325 that may include a frequency transformation (e.g., iDCT and Fourier transform) to convert the frequency domain sequence F(j) 326 to the audible speech signal s(i) 328 in the time domain. Notably, there is less amount or quantity of data to be processed by the signal generation unit of the frequency domain embodiment as compared to the signal generation unit of the time domain embodiment.

Back-End Subsystem Training Mode

FIG. 4A is a block diagram of the TTS system in training mode. Embodiments include a back-end training system 400 used to iteratively modify (i.e., train) the neural network based on psychoacoustic processing (e.g. masking) and allowing for ignoring the processing of inaudible sound/speech imperfections (e.g., non-perceived sounds/perceived flaws) to determine a quality indicator used as feedback to change weights and/or a topology of the neural network. Specifically, the training system 400 may use frequency and time domain reference signals from original reference recordings as reference audio signals that are compared to (e.g., subtracted from) the generated audible speech (in frequency and time domains) to determine with help of the psychoacoustic processing (e.g., generated parameters/weights) an audible error sound signal. The calculated audible sound error signal may include frequency and time domain components to calculate the quality indicator used to train the neural network.

The back-end training system 400 may apply psychoacoustic principles to measure a quality of the generated audible speech signal 328, so as to train the neural network of the back-end subsystem 230. To that end, components of the back-end training system 400 function together as an adaptive interference system. In particular, the back-end training system 400 extracts data from the signal generation unit 300 during training to determine the quality indicator. The back-end training system 400 may include a psychoacoustic weight/parameter generator 420 in calculating feedback to train the neural network. The psychoacoustic weight/parameter generator 420 may be used to ignore feedback error signals that are inaudible, thus further reducing information needed to be captured by the neural network (i.e., reducing size, complexity and training time for the neural network).

Notably, the back-end training system 400 utilizes the generated audible speech signal in the time domain, s(i) 328, and the frequency domain, F(j) 326, as inputs as well as an original recording (e.g., a reference signal Ref_s(i) 414) for training data that may be generated by front-end subsystem 220 or applied directly to the back-end sub-system, including phoneme sequence 222, base frequency 224, and duration 226. In this manner, errors in both the time domain and frequency domain are employed to train the neural network. As such, the time domain and frequency domain embodiments of the back-end training systems 400 vary largely in application of appropriate time-to-frequency domain transformation.

The back-end subsystem 230 may receive as input training data as samples including phoneme sequence, base frequency, and duration of phonemes from sources other than the front-end subsystem 220. In various embodiments, the training data may be from (i) a look-up table, (ii) a completely different TTS system, or (iii) another source. As a result, the back-end sub-system 230 may be part of a TTS system that does not include a front-end sub-system.

Figure 4B:
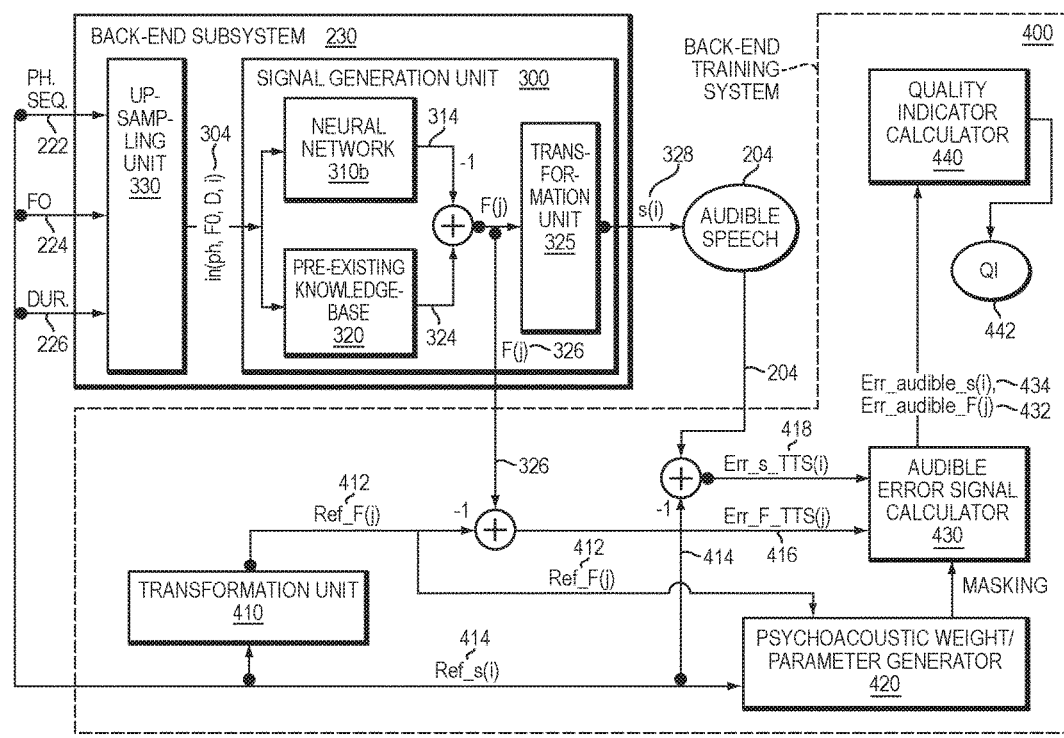
FIG. 4B is a block diagram of the back-end subsystem interacting with a back-end training system as applied to frequency domain speech generation.

FIG. 4B is a block diagram of the back-end subsystem 230 interacting with the back-end training system 400 as applied to frequency domain speech generation. For example, where the pre-exiting knowledgebase 320 of the back-end subsystem 230 may include (i.e., encode for synthesis) several hours of audible speech (e.g., 20 hours of recorded audible speech), there is likely a difference between the generated audible speech s(i) 328, 204 and the original recording Ref_s(i) 414 (transformed as frequency domain signal Ref_F(j) 412). Illustratively, this difference is converted by the back-end training system 400 into a signal error Err_s_TTS(i) 418 for audible speech s(i) 328 in the time domain and an error Err_F_TTS(j) 416 for the frequency domain sequence F(j) 326. Thus, the time domain comparison outputs signal error Err_s_TTS(i) 418 with respect to audible speech 328 and the frequency domain comparison outputs error Err_F_TTS(j) 416 with respect to the frequency domain sequence F(j) 326.

Figure 4C:
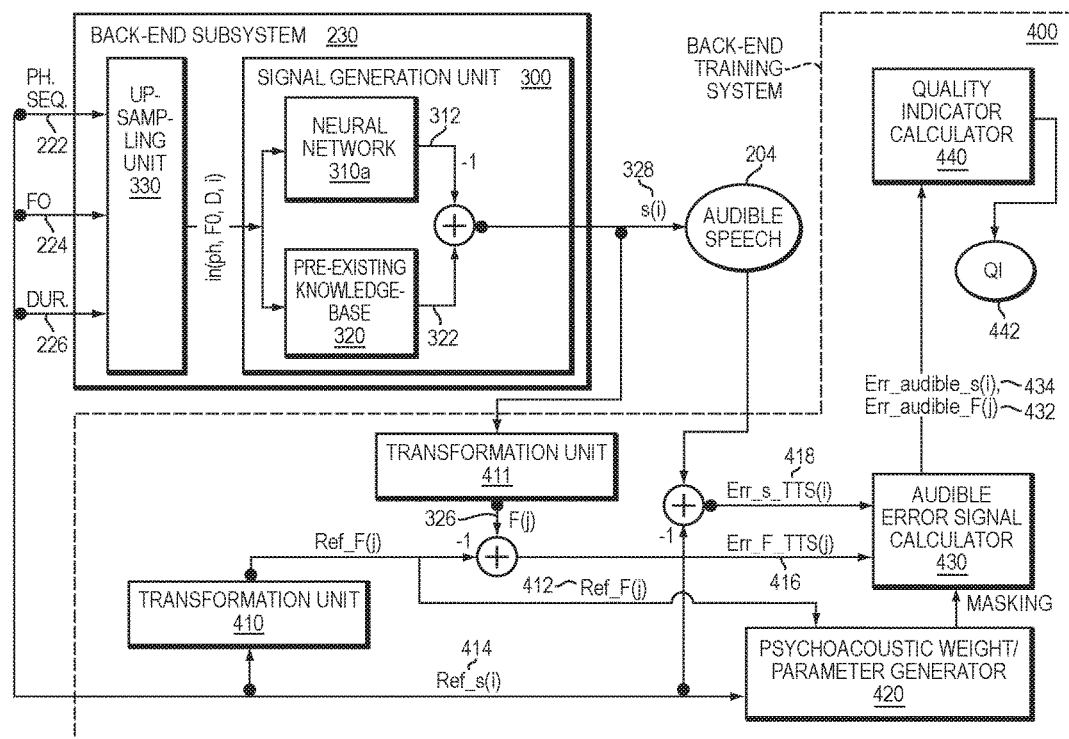
FIG. 4C is a block diagram of the back-end subsystem interacting with the back-end training system as applied to time domain speech generation.

As shown in FIGS. 4B and 4C, the phoneme sequence 222, base frequency 224 and duration 226 information from the original recording, as well as the related recorded reference (i.e., near optimal) audio speech signal (e.g., the reference signal, Ref_s(i) 414) are used as training or reference signal information Ref_s(i) 414 by the back-end training system 400. The back-end training system 400 has a transformation unit 410 that transforms this reference information (i.e., Ref_s(i) 414) to the frequency domain resulting in a reference frequency domain sequence Ref_F(j) 412. Note that the embodiment described in FIG. 4B differs from that of FIG. 4C in that the neural network 310a and pre-existing knowledgebase 320 of signal generation unit 300 of FIG. 4B are configured to generate the frequency domain speech signal F(j) 326 which is transformed by the transformation unit 325 into time domain audible speed signal 328, 204.

FIG. 4C is a block diagram of the back-end subsystem 230 interacting with the back-end training system 400 as applied to time domain speech generation. Note that the embodiment described in FIG. 4C differs from the embodiment described in FIG. 4B in that the neural network 310b and pre-existing knowledgebase 320 of signal generation unit 300 of FIG. 4C are configured to generate an audible speech signal directly in the time domain (whereas the neural network 310b and pre-existing knowledgebase 320 of signal generation unit 300 of FIG. 4B generate the frequency domain sequence F(j) 326). In addition, the back-end training system 400 includes another transformation unit 411 to convert the audible speech signal 328 into the frequency sequence F(j) 326, as well as the transformation unit 410 to convert the reference signal, Ref_s(i) 414, to a reference frequency domain sequence Ref_F(j) 412. The remaining portions of the embodiments depicted in FIGS. 4B and 4C are the same.

Illustratively, with regard to the frequency domain, the back-end training system 400 adds the reference frequency domain sequence, Ref_F(j) 412 (where reference frequency domain is negative), to the frequency domain sequence, F(j) 326, of the signal generation unit to create the error Err_F_TTS(j) 416. Mathematically, the reference frequency domain sequence Ref_F(j) 412 is subtracted from the frequency domain sequence F(j) 326 such that the error Err_F_TTS(j) 416 is the difference.

With regard to the time domain, the back-end training system 400 adds the reference signal information Ref_s(i) 414 (where reference signal information is negative) to the audible speech signal, s(i) 328, resulting in the signal error Err_s_TTS(i) 418. Mathematically, the reference signal information Ref_s(i) 414 is subtracted from the audible speech signal, s(i) 328, such that the signal error Err_s_TTS(i) 418 is the difference.

Psychoacoustic Model

In general, the back-end training system 400 is used to compare the frequency domain sequence to the internal frequency representation of the back-end subsystem 230 resulting in the error Err_F_TTS(j) 416 in frequency domain and the signal error Err_s_TTS(i) 418 in time domain. These two errors 416, 418 are used in applying a psychoacoustic model to ignore (i.e., remove) feedback error signals that are inaudible. For example, a typical human listener has difficulty perceiving a tone (i.e., single frequency signal) when that tone is smaller than an even stronger tone and both tones are contemporaneous and of similar frequency. This is referred to as "frequency masking". It may also be difficult to identify signals temporally close to a rather strong pulse-like signal, because the smaller signals before and after the large pulse-like signal are masked. This is referred to as "temporal masking". Illustratively, temporal masking and frequency masking are two principal masking effects applied in psychoacoustic models. As is known to persons of skill in the art, other psychoacoustic modelling approaches also may be applied.

The back-end training system 400 analyzes the two reference signals Ref_s(i) and Ref_F(j) (one being in time domain and one being in frequency domain) to identify where masking occurs and does not occur (e.g., what is masked and where masking does not happen). The masking information is useful for determining where and how much signal errors may be tolerated, because masking occurs, and where errors should be reduced by the training system, because no masking occurs. With masking considered, the neural network may be optimized for only audible signals (e.g., signals that a listener can perceive). Illustratively, the psychoacoustic weight/parameter generator 420 may identify locations and energy levels which are audible and not audible. The psychoacoustic weight/parameter generator 420 may apply this identified information to generate audible errors as described above.

As shown in FIG. 4B (and similarly in FIG. 4C), the psychoacoustic weight/parameter generator 420 may define samples and related maximum error levels (not shown) to determine when errors become audible, i.e., perceived by a listener. Illustratively, inputs for the psychoacoustic weights/parameter generator 420 may include the reference recordings or audio signals, such as the reference signal information Ref_s(i) 414 and reference frequency domain sequence Ref_F(j) 412. In an embodiment, the psychoacoustic weight/parameter generator 420 may determine masking information that identifies thresholds above which error signals are audible (i.e., acceptable) to a listener. To that end, the psychoacoustic weight/parameter generator 420 may output masking information in the frequency domain and the time domain, e.g., limits for maximum error levels based on analysis of masking threshold(s) in the frequency domain and the time domain. The masking information may be used to ignore (i.e., decrease) training efforts for the neural network 310a,b to reduce error signals (e.g., Err_s_TTS(i) 418 and Err_F_TTS(j) 416) corresponding to the generated speech 328 which are inaudible, i.e., error signals are not improved with training loops focusing on inaudible errors.

In an embodiment, the psychoacoustic weight/parameter generator 420 applies different thresholds in the time domain as in the frequency domain to employ masking. That is a first psychoacoustic threshold is used in time domain and a second psychoacoustic threshold is used in the frequency domain. As a result, inaudible errors may be filtered out, leaving audible-only errors to train the neural network.

Audible Error Calculation

The back-end training system 400 has an audible error signal calculator 430 that receives the masking information from the psychoacoustic weight/parameter generator 420. Illustratively, based on the masking information, the audible error signal calculator 430 outputs an audible error in time domain Err_audible_s(i) 434 (e.g., audible time domain errors for each in-vector sample of the phoneme sequence) and a audible error in frequency domain Err_audible_F(j) 432(e.g., audible frequency domain errors for each in-vector sample of the phoneme sequence). As used herein, each of these error signals (i.e., Err_audible_s(i) 434 and Err_audible_F(j) 432) may characterize the ability of the neural network 310a,b to correct audible errors (i.e., correct or reduce perceived flaws) in the produced speech signal 328. A "total audible error signal energy" (represented as a quality indicator QI 422) can be calculated based on time domain and frequency domain audible errors, i.e., as a total time domain error and as a total frequency domain error applied to audible-only portion(s) of the samples.

The audible error signal calculator 430 calculates the audible error signal based on psychoacoustics analysis implemented in the psychoacoustic weight/parameter generator 420. The audible error signal calculator 430 uses the masking information, to filter out inaudible errors by monitoring the audible error signal energy with respect to the masking information (e.g., masking threshold). Illustratively, audible errors below the masking threshold are ignored (i.e., discarded), because the overall perceived audio speech signal is not reduced in quality by such inaudible errors. However, above the masking threshold, the back-end training system 400 provides feedback to train the neural network to correct perceived speech signal problems, i.e., corrects for perceived speech signal distortion (i.e., defects). As a result, the audible error signal calculator 430 outputs total audible error signals (e.g., Err_audible_s(i) 434 and Err_audible_F(j) 432) which excludes or ignores error signals (i.e., Err_s_TTS(i) 418 and Err_s_TTS(j) 416) that are inaudible. Thus, the back-end training system 400 is psychoacoustically optimized to train the neural network for audible-only errors, i.e., optimized for errors in speech that can be heard (perceived), whereas inaudible errors do not trigger unnecessary training.

The back-end training system 400 includes a quality indicator calculator 440 that determines a quality indicator QI 442 or quality criteria based on the audible-only sum error energy totals in the time domain and frequency domain, e.g., the total of all error energy in Err_audible_s(i) 434 and Err_audible_F(j) 432. Thus, the quality indicator calculator determines the QI based on the audible error, Err_audible_s(i) 434 in time domain for each sample, and the audible error Err_audible_F(j) 434 in frequency domain for each sample. In an embodiment, the neural network is trained when the QI 442 is above a non-zero quality threshold (not shown). The neural network may be iteratively trained so that QI is minimized and ideally converged to zero (i.e., within the quality threshold) over time. That is, if the QI is zero, then the back-end sub-system does not need further training. However, if the QI is not zero (i.e., above the quality threshold), then the neural network may be re-configured (e.g., the neural network may be reconfigured automatically to generate new speech signal corrections by changing topology and/or changing neural network weights) such that during training mode, the QI is zero or at least converges closer to zero.

In sum, the audible error signal calculator 430 determines total audible error signals in the time domain and the frequency domain (as perceived by human listeners) by comparing audible errors (in the time domain and frequency domain) of the generated speech signal with errors of the TTS output signal s(i) 328 above the psychoacoustic masking thresholds in the time domain and the frequency domain. The quality indicator calculator 440 may determine the quality indicator 442 based on total audible errors in the time domain and frequency domain that are listener perceivable. This is done for each set of parameters or any training data (compare current set against previous set to determine improvement in quality) such that QI is ideally zero or at least close to zero.

Transformation Strategies for Voiced and Unvoiced Phonemes

Generally, audible speech signals (in the time domain and frequency domain) may be described with more compact information by using optimized representations for particular phonemes. For example, a sound of a phoneme for the letter "M" has a typical pattern for the distribution of frequency lines, which may be represented as a first order (i.e., first order harmonic set), second order and so on. This results in reduced information as compared to the time domain to represent the sound of the phoneme which requires less processing and memory resources for the TTS system for a same quality of output as a TTS system that uses all frequency lines present (or a time domain representation) of the particular phoneme. This improvement in information representation allows for smaller, less expensive embedded systems with lower performance processors and less memory to provide quality text to speech conversion.

Further, the optimized phoneme representation extends to all aspects of the text-to-speech conversion as this reduces the internal data representation of the phoneme so that (i) the pre-existing knowledgebase may be reduced in size and memory consumption, (ii) an output width of neural network may be reduced, and (iii) training time of the neural network may be reduced, because the back-end subsystem and back-end training system no longer require processing of all frequencies on all samples. The error signal generation may also be compacted as a result of compacting translation of phonemes to speech with commensurate reduction in a size and complexity of the neural network as well as sharing a same data structure/model with the pre-existing knowledgebase. Illustratively, this may be accomplished with the pre-existing knowledgebase, for example, by adding a database containing sound profiles for different letters such as "M" or other letters (having different base frequencies for high pitch or low pitch). The neural network may be used to process parameters from the pre-existing knowledgebase, e.g., the neural network may create a signal indicating imperfections (i.e., errors) in the phonemes in the pre-existing knowledgebase (e.g., a phoneme may need to be adjusted to improve sound based on the imperfection). As described above, the pre-existing knowledgebase may include knowledge or data such as pre-existing or pre-determined phoneme knowledge.

Human speech has a typical base frequency between about 120 Hz and 150 Hz. A sound of each letter (e.g., the letter "A") has a base frequency. This letter signal may be split up into base waves (fundamental frequency can change from letter to letter, e.g., 120 Hz for "A" and having waves with a frequency above 120 Hz, seen as harmonics). These harmonics have specific distribution patterns for each phoneme (e.g. letter "A" or "M"). For example, consider a 100 Hz signal for 100 ms involving a couple thousand samples, depending on sample rate. From samples and sample rates, the TTS system may compose a time domain signal with many frequency lines (e.g., base frequency and all the harmonic frequencies). As a result, each frequency line is treated as equally important for perceived speech. However, it is not the case that these frequency lines are independent. Instead, the frequency lines may have dependencies specific for each phoneme or class of phonemes. Principle component analysis (PCA) may be used to take advantage of this observation.

A signal for a phoneme, such as the letter "M," may include slight deviations from a profile of the letter (minor deviations). For example, instead of having, e.g. 1000 frequency lines, 5 to 10 parameters (e.g., frequency lines) may sufficiently describe the letter profile and its deviations for a sufficiently accurate modelling of the phoneme. This results in significant data reduction. By limiting derivations, such as not taking into account 7th or 8th derivation (i.e., a respective 7th or 8th component vector of the principle component analysis), a lossy representation of sufficient quality (i.e., having some inaccuracy) is created. Thus, changing a representation of the phoneme to a few parameters may result in the lossy representation such that the inaccuracy represents inaudible errors. The lossy representation for each phoneme may vary based on how different speech synthesis results from the sound profiles on phoneme boundaries (e.g., phoneme-to-phoneme co-articulation).

Figure 5A:
FIG. 5a, b, c illustrate three exemplary transformation/representation strategies for voiced phonemes.

FIG. 5a, b, c illustrate three exemplary transformation/representation strategies for voiced phonemes. Illustratively, the transformation unit 411 uses discrete cosine transform (DCT) to transform audible speech s(i) 328 to a frequency domain sequence F(j) 326. Note that the transformation (e.g., Fourier transformation) means that there is a periodic signal for each pitch. As a result, there are typical transformations where fundamental waves and a set of specific harmonic waves are described in a certain period. Note also that the transformation 411, i.e., transforming s(i) to F(j), is itself lossless.

FIG. 5a illustrates a simple process of transforming s(i) to F(j) as described above and shown in previous figures. Voiced phonemes (or part of voiced phonemes) may be modelled by principal component analysis (PCA).

Figure 5B:
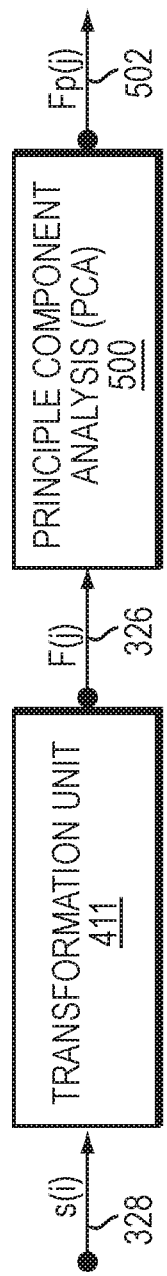

FIG. 5b illustrates transformation of s(i) to F(j) and applying PCA 500 to F(j) resulting in a PCA parameter sequence Fp(j) 502 in the frequency domain, where p may refer to an observed period for the PCA parameter sequence. The PCA 500 may be applied for each phoneme and position of the observed period in a phoneme. Notably, during the PCA process, the phoneme representation remains lossless where all components of the PCA are processed. Applying PCA may take advantage of similarities within same phonemes or parts of phonemes depending on position and context of the observed period.

Figure 5C:
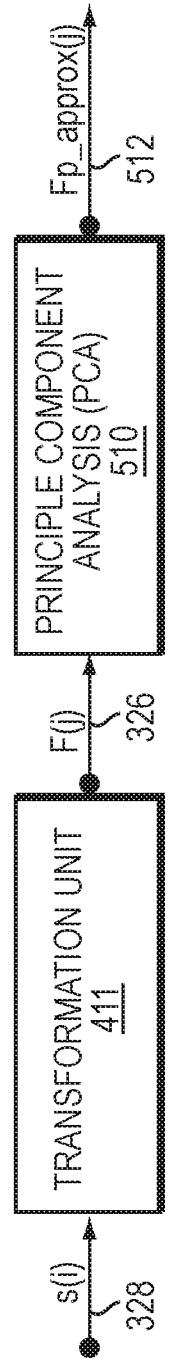

FIG. 5c illustrates transformation of s(i) to F(j) and applying PCA 500 to F(j) resulting in an approximate pitch sequence Fp_approx(j) 512 in the frequency domain, where p may refer to the observed period for the PCA parameter sequence. The PCA 500 may be applied for each phoneme and position of the observed period in the phoneme. The PCA 500 representation may be lossy when a j is ignored greater than a predetermined j-threshold (e.g., the number of frequency lines threshold). Since the predetermined j-threshold is generally much smaller than a maximum number of samples in the time domain for the same observed period representing the phoneme, storage and processing requirements are significantly reduced. In an embodiment, a predetermined j-threshold (not shown) may be defined based on psychoacoustic analysis for each observed period or dynamically while minimizing the QI in the training system.

As is understood by persons of skill in the art, other transformations may be applied in addition to frequency domain and time domain. For example, the other transformations may include principle component analysis (PCA), transformations where frequency transformation is enhanced, and the like.

Figure 6:
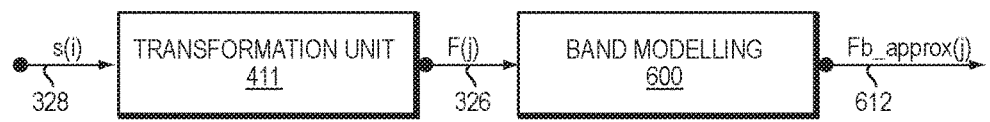
FIG. 6 is illustrates a lossy modeling strategy for unvoiced phonemes.

FIG. 6 illustrates a lossy modeling strategy for unvoiced phonemes. Different modelling strategies may be applied for voiced phonemes versus unvoiced phonemes. The modelling approach of PCA for voiced phonemes, as previously described, typically loses some of its advantage when applied to unvoiced phonemes. Unvoiced phonemes relate to the sound for the letters such as "S", "F" which have mostly audible noise when spoken. Thus, representing unvoiced phonemes with a limited number of frequency lines is very inaccurate.

Instead, system models based on noise bands, e.g., noise within frequency ranges, such as 500 Hz to 1 kHz, 2 kHz to 4 kHz, and the like may be used. By combining a limited number of frequency bands with specified bandwidths, a noise energy may be determined that results in effective and efficient unvoiced phoneme representation with significant reduction in data.

In FIG. 6, the transformation unit 411 transforms the generated speech signal s(i) 328 to the frequency domain sequence F(j) 326 and applies a band modelling 600 to yield a sequence of band parameters, Fb_approx(j) 612, in the frequency domain that approximates F(j) where b may refer to parameters modelling the noise bands and where adjacent frequencies are combined into a few bands having the parameters. This results in a small number of bands and parameters to adequately represent the unvoiced phoneme, instead of using all the frequency lines of the transformation. Note that the band modelling representation is lossy. In an embodiment, band modeling parameters may be predetermined based on psychoacoustic analysis for each observed period or dynamically while minimizing QI in the training system.

Figure 7:
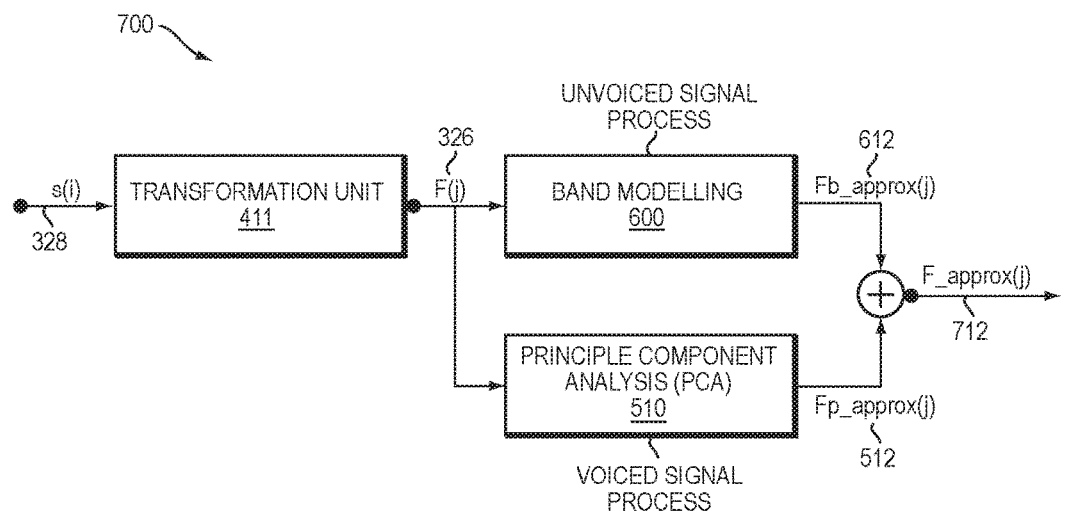
FIG. 7 is a block diagram representing combining transformation strategies for voiced and unvoiced phonemes.

FIG. 7 is a block diagram representing combining transformation strategies for voiced and unvoiced phonemes. Illustratively, the transformation unit 411 transforms the generated speech signal s(i) 328 to the frequency domain sequence F(j) 326 to which unvoiced phoneme and voiced phoneme signal processing is applied. Notably, co-articulated phonemes in words may include both voiced and unvoiced phonemes before and after one another (e.g., "M" followed by "S"), so that the generated speech signal may overlap both types of phonemes. As a result, both approaches may be mixed for a signal period, a phoneme, or pitch periods in a phoneme. Voiced phonemes are typically composed of voiced/harmonic signals in a relatively lower frequency band and in higher frequency bands either the phase information may be redundant or use of a modelling approach with noisy frequency bands may be applied. In an embodiment, a low frequency part of a voiced phoneme is modeled with PCA and above a certain frequency the noise band modeling may be used.

As previously described, band modelling 600 having a lossy representation is applied to the F(j) 326 for unvoiced phonemes resulting in Fb_approx(j) 612. Similarly, for voiced phonemes, the PCA 510 having lossy representation is applied to F(j) 326 resulting in Fp_approx(j) 512. These two results are combined to approximate any type of speech signal with voiced and unvoiced signal parts. Mathematically, Fb_approx(j) 612 is added to Fp_approx(j) 512 such that F_approx(j) 712 is a resulting sum. As such, F_approx(j) 712 is the parameter sequence approximating F(j) based on the combined outputs from modelling voiced and unvoiced parts of a phoneme. In this manner, phonemes and co-articulations of phonemes may be closely approximated, such as the sound of the letter "S" with an F(j) approximation close to a correct Fourier (i.e., DCT) transformation. Note that the modelling is not lossless as the previously described lossy transformations are used in combination. For example, losses in PCA may be based on limits to derivation processing/number of considered PCA vectors in which modelling of noise bands is only appropriate for part of a noisy phoneme.

Pitch Normalization

As a further refinement, some embodiments normalize a processing period for different phoneme pitches by including pitch normalization during the input vector up-sampling and applying inverse pitch normalization to the generated audible speech. In this manner, processing is simplified as only periods of a same length are processed. Specifically, pitch normalization during up-sampling converts the signal to a single (i.e., normalized) frequency having a same pitch length. The trained neural networks will, in this case, also be trained for compensating imperfections introduced via pitch normalization.

Figure 8:
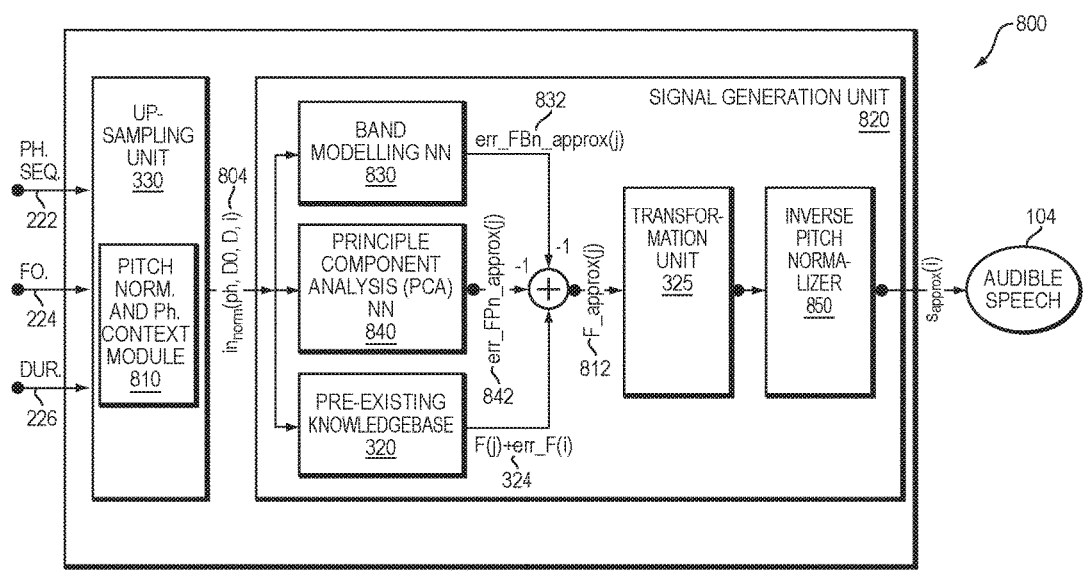
FIG. 8 is a block diagram of a back-end sub-system of the TTS applying pitch normalization and including compact phoneme knowledge.

FIG. 8 is a block diagram of a back-end subsystem 800 of the TTS system applying pitch normalization and including compact phoneme knowledge/processing. Illustratively, the back-end subsystem 800 operates using frequency domain for synthesis of a speech signal and includes applying pitch normalization to the combining transformation strategies for voiced and unvoiced phonemes. The back-end subsystem 800 may utilize pitch normalized modelling strategies for voiced and unvoiced phonemes to normalize length of processed signal periods as a pitch synchronous operation. The system benefits from every pitch having a same length determined from the base frequency 224 (a respective fixed period length). As a result, periods may be enforced with different base frequencies to obtain a same period length across all periods. Processing is simplified as only periods of the same length are processed.

In an embodiment, the back-end subsystem 800 includes the upsampling unit 330 and a signal generation unit 820. The upsampling unit includes a pitch normalization and phoneme context module 810. In some examples, signal degradation occurs because pitch normalization (i.e., pitch modification) is not loss-less (i.e., pitch normalization degrades the signal). However, the neural network may be trained to compensate for the signal degradation. The pitch normalization and phoneme context module 810 normalizes pitch of the upsampled input phoneme sequence 222, base frequency 224 and duration 226 by converting it to a single normalized frequency so that each pitch in the speech signal has a same length reducing signal processing as only one pitch length needs to be processed. Further, the pitch normalization and phoneme context module 810 may normalize the in-vector in(ph, F0, D, context, i) to a mean pitch. Illustratively, the upsampling unit outputs a normalized in-vector $in_{norm}$ (ph, F0, D, context, i) 804 with respect to phoneme sequence 222, base frequency 224, and duration 226, as well as the context to the signal generation unit. In an embodiment, a frequency transformation unit 325 may be located within the signal generation unit 820.

Illustratively, the signal generation unit is configured to function in the frequency domain with support of a compact phoneme specific pre-existing knowledgebase. The signal generation unit may combine band modelling of the unvoiced signal process and the PCA of the voiced signal process as previously described. These processes may be implemented as neural networks such that the signal generation unit has a band modelling neural network 830 and a PCA neural network 840. The signal generation unit also includes a pre-existing knowledgebase 320. As shown in FIG. 8, the band modelling neural network 830, PCA neural network 840, and pre-existing knowledgebase 320 receive the in-vector $in_{norm}$ (ph, F0, D, context, i) 804 as inputs.

The band modelling neural network 830 may convert the in-vector to unvoiced signal error parameters by combining adjacent frequencies into frequency bands using a few band modelling parameters resulting in lossy representation instead of a maximum number of frequency lines, $j_{max}$. Notably, the $j_{max}$ may be the same for all pitch periods due to pitch normalization. The band modelling neural network 830 may output the approximate unvoiced signal error parameters, err_Fbn_(j)_approx(j) 832. As described previously, input for the band modelling may operate in the frequency domain.

Similarly, the PCA neural network 840 converts the in-vector to voiced signal error parameters for each phoneme and position of pitch in the phoneme, where representation may be lossy. Illustratively, the PCA neural network 840 ignores j when j is greater than some number of frequency lines. The PCA neural network outputs the approximate voiced signal error parameters, err_Fpn_approx(j) 842. As described previously, the band modelling neural network 830 may operate in the frequency domain.

As described above, the pre-existing knowledgebase outputs the basic signal including the frequency domain sequence F(j) combined with the related error signal err_F(j) in the frequency domain. In an embodiment, the pre-existing knowledgebase may be a lookup table according to target pitch and context.

The three outputs of the band modelling neural network 830, PCA neural network 840, and the pre-existing knowledgebase 320 may be combined such that the voiced signal error parameters err_Fpn_approx(j) 842 and the unvoiced signal error parameters err_Fbn_approx(j) 832 are added to the basic signal, where the error parameters are negative. Mathematically, the voiced signal error parameters err_Fpn_approx(j) 842 and unvoiced signal error parameters err_Fbn_approx(j) 832 are subtracted from the basic signal F(j)+err_F(j) 324 resulting in audible speech as a frequency domain sequence F_approx(j) 812.

The signal generation unit 820 has a transformation unit 325 that may convert the frequency domain sequence F_approx(j) 812 from frequency to time domain. This transformation unit may be an inverse transformation unit such as an inverse DCT. The transformation unit outputs pitch normalized approximated audible speech $S_{approx}(i)$ in the time domain.

The signal generation unit 820 may also have an inverse pitch normalizer/quantizer 850 that performs inverse pitch modification to produce the approximated audible speech $s_{approx}(i)$ 104. The inverse pitch normalizer 850 normalizes pitch of approximated audible speech to an original pitch. In an embodiment, the inverse pitch modification may be applied using an algorithm such as pitch synchronous overlap and add.

The pre-existing knowledgebase 320 may include a lookup for a reference signal for different phonemes based on different letters (e.g., models are letter approximated and may have respective error signals err_F(j)). As described above, these error signals may be corrected (i.e., compensated) by error outputs of the band modelling neural network and the PCA neural network.

In other embodiments, the signal generation unit may include one or more neural networks trained to compensate for imperfections such as error signals of approximated models. FIG. 8 illustrates how to produce speech signals with correctable audible errors (resulting from imperfection in the pre-existing knowledge and pitch normalization), because modelling neural networks produce approximated speech signal errors. The audible errors may be corrected by neural networks 830, 840, as previously described, to improve signal quality. Notably, these neural networks may operate on the model parameters for voiced/unvoiced phoneme pitches to provide correcting information with the PCA neural network (e.g., PCA coefficients) and noise band parameters with the band modelling neural network. Note also that the training process for the neural networks (and optionally for parameters in the pre-existing knowledgebase) remains efficient, because of the efficient modelling of the PCA neural network and the band modelling neural network.

Advantageously, the technique described herein improves training speed and speech output quality. Specifically, (i) the neural network need not be trained to synthesize speech, but need only be trained to correct inaccuracies in the pre-existing knowledgebase; (ii) the training of the neural network may be simplified by training for inaccuracies and imperfections according to a psychoacoustic model and discarding inaudible corrections; and (iii) the complexity and training of the neural network may be further reduced by using speech signal specific modeling techniques (e.g., principal component analysis (PCA) for voiced phonemes and noise band/energy band modelling for unvoiced phonemes).

The foregoing description has been directed to specific aspects of the disclosure. It will be apparent, however, that other variations and modifications may be made to the described implementations, with the attainment of some or all of their advantages. For instance, it is expressly contemplated that the components and/or elements described herein may be implemented as software encoded on a tangible (non-transitory) computer-readable medium (e.g., disks and/or CDs) having program instructions executing on a computer, hardware, firmware, or a combination thereof. Accordingly, this description is to be taken only by way of example and not to otherwise limit the scope of the aspects of the disclosure. Therefore, it is the object of the appended claims to cover all such variations and modifications as come within the true spirit and scope of the subject matter.

What is claimed is:

1. A text-to-speech (TTS) system comprising:
  a front-end subsystem configured to provide analysis and conversion of text into an input vector having a base frequency for a phoneme, a phenome duration, and a phoneme sequence; and
  a back-end subsystem coupled to the front-end subsystem and configured to convert the input vector of the base frequency, the phoneme duration and the phoneme sequence into an intermediate vector for processing by a signal generation unit of the back-end subsystem, the signal generation unit having a neural network interacting with a pre-existing knowledgebase of phonemes, wherein the signal generation unit is configured to use the neural network interacting with the pre-existing knowledgebase of phonemes to apply an error signal to correct for speech signal distortions of the pre-existing knowledgebase of phonemes to generate the speech signal.

2. The TTS system of claim 1 further comprising a transformation unit that converts a frequency domain signal combined from the neural network and the pre-existing knowledgebase into the speech signal.

3. The TTS system of claim 1 wherein the pre-existing knowledgebase of phonemes comprises average basic acoustic signal data of how a speaker speaks derived from averaging of hours of recorded audible speech.

4. The TTS system of claim 1 wherein the neural network is configured to correct for psychoacoustic perceived speech signal distortions of the pre-existing knowledgebase of phonemes.

5. The TTS system of claim 1 wherein the back-end subsystem is further configured to upsample a frequency of the input vector provided to the neural network and the pre-existing knowledgebase to another frequency of the intermediate vector.

6. The TTS system of claim 5 wherein the upsampling unit includes a pitch normalization to normalize a pitch length of the input vector, and wherein the back-end subsystem includes an inverse pitch normalization unit to normalize the speech signal from the transformation unit.

7. The TTS system of claim 1 wherein the neural network is configured to correct errors of voiced phonemes of the pre-existing knowledgebase of phonemes based on principal component analysis.

8. The TTS system of claim 7 wherein the principal component analysis is based on lossy modelling.

9. The TTS system of claim 7 wherein the back-end subsystem includes another neural network configured to correct errors of unvoiced phonemes of the pre-existing knowledgebase of phonemes based on noise band modelling.

10. The TTS system of claim 1 wherein the neural network is configured based on psychoacoustic modeling of phonemes.

11. A method of processing text-to-speech comprising:
receiving an input vector having a base frequency for a phoneme, a phenome duration for the phoneme, and a phoneme sequence;
upsampling the input vector of the base frequency, the phoneme duration and the phoneme sequence into an intermediate vector;
generating a speech signal from the intermediate vector using a pre-existing knowledgebase of phonemes; and
applying an error signal from a neural network to correct for speech signal distortions of the speech signal based on an interaction between the neural network and the pre-existing knowledgebase.

12. The method of processing text-to-speech of claim 11 further comprising converting a frequency domain signal combined from the error signal and the generated speech signal of the pre-existing knowledgebase into a time domain speech signal.

13. The method of processing text-to-speech of claim 11 wherein the pre-existing knowledgebase of phonemes comprises average basic acoustic signal data of how a speaker speaks derived from averaging of hours of recorded audible speech.

14. The method of processing text-to-speech of claim 11 wherein the neural network is configured to correct for psychoacoustic perceived speech signal distortions of the pre-existing knowledgebase of phonemes.

15. The method of processing text-to-speech of claim 11 further comprising applying an output of another neural network to correct for speech signal distortions of unvoiced phonemes of the speech signal based on noise band modelling.

16. The method of processing text-to-speech of claim 11 wherein the upsampling further includes normalizing a pitch length of the input vector, and where the time domain signal is normalized using inverse pitch normalization.

17. The method of processing text-to-speech of claim 11 wherein the neural network configured to correct the signal distortions of the speech signal for voiced phonemes of the pre-existing knowledgebase of phonemes based on principal component analysis.

18. The method of processing text-to-speech of claim 17 wherein the principal component analysis is based on lossy modelling.

19. The method of processing text-to-speech of claim 11 wherein the neural network is configured based on psychoacoustic modeling of phonemes.

20. A non-transitory computer-readable medium having program instructions which, when executed across one or more processors, causes at least a portion of the one or more processors to perform operations comprising:
receiving an input vector having a base frequency for a phoneme, a phenome duration for the phoneme, and a phoneme sequence;
upsampling the input vector of the base frequency, the phoneme duration and the phoneme sequence into an intermediate vector;
generating a speech signal from the intermediate vector using a pre-existing knowledgebase of phonemes; and
applying an error signal from a neural network to correct for speech signal distortions of the speech signal based on interactions between the pre-existing knowledgebase.

* * * * *